United States Patent [19]

Dembrosky

[11] Patent Number: 5,573,677
[45] Date of Patent: Nov. 12, 1996

[54] WASHING MACHINE RINSE WATER RECOVERY APPARATUS AND METHOD

[76] Inventor: Edward Dembrosky, 1012 Telegraph Rd., Perkasie, Pa. 18944

[21] Appl. No.: 268,968

[22] Filed: Jun. 30, 1994

[51] Int. Cl.$^6$ .................................................. C02F 1/68
[52] U.S. Cl. .................... 210/764; 210/765; 210/805; 210/87; 210/99; 210/128; 210/205; 210/218; 210/251; 210/167; 210/194; 68/12.13; 68/18 F; 68/902
[58] Field of Search ........................... 210/749, 764, 210/805, 138, 104, 167, 194, 198.1, 99, 85, 87, 765, 124, 128, 218, 251, 205; 68/12.13, 13 R, 18 F, 902

[56] References Cited

U.S. PATENT DOCUMENTS

| | | |
|---|---|---|
| 2,300,952 | 11/1942 | May . |
| 2,884,947 | 5/1959 | Gerhardt . |
| 3,514,631 | 5/1970 | Best et al. . |
| 3,543,294 | 11/1970 | Boester . |
| 3,592,214 | 7/1971 | Woehler . |
| 4,115,879 | 9/1978 | Toms .................................... 4/318 |
| 4,162,218 | 7/1979 | McCormick ............................ 210/104 |
| 4,197,597 | 4/1980 | Toms .................................... 4/300 |
| 4,228,006 | 10/1980 | Hanna ................................... 210/167 |
| 4,624,118 | 11/1986 | Yamakawa et al. ..................... 68/902 |
| 4,904,387 | 2/1990 | Jordan ................................... 210/605 |
| 5,039,407 | 8/1991 | Mohrman ............................. 210/195.1 |
| 5,100,540 | 3/1992 | Ramirez et al. ......................... 210/86 |
| 5,106,493 | 4/1992 | McIntosh ................................ 210/100 |
| 5,110,479 | 5/1992 | Frommer et al. ....................... 210/662 |
| 5,147,532 | 9/1992 | Leek, Jr. .................................. 210/97 |
| 5,160,606 | 11/1992 | DeSimone et al. ..................... 210/110 |
| 5,173,180 | 12/1992 | Stewart et al. .......................... 210/167 |
| 5,241,843 | 9/1993 | Hein ........................................ 68/902 |
| 5,285,665 | 2/1994 | Hetrick, Jr. .............................. 68/902 |
| 5,307,650 | 5/1994 | Mertz ...................................... 68/902 |

Primary Examiner—Robert J. Popovics
Attorney, Agent, or Firm—Joseph W. Molasky & Associates

[57] ABSTRACT

A cloudy water recovery and recycling apparatus and method of use. The apparatus recovers cloudy water defined as water recovered from the rinse cycle of a clothes washing machine. The apparatus is comprised of an electronic controller, a storage tank, a trap having a lint screen, a pumping means, and a pressurized storage container. Water from a clothes washing machine is separated into rinse water and wash water by an electronic controller. The wash water is disposed of and the rinse water is strained to remove lint, collected in the storage tank, treated with dye and bactericide, pumped from the storage tank to a pressurized container and then utilized to flush at least one toilet.

12 Claims, 2 Drawing Sheets

WASHING MACHINE RINSE WATER RECOVERY APPARATUS AND METHOD

BACKGROUND OF THE INVENTION

The present invention relates to an apparatus for conserving water, and more particularly to an apparatus for recovering water from the rinse cycle of a clothes washing machine for use in flushing toilets.

The National Association of Plumbing, Heating, and Cooling Contractors, in their assessment of on-site grey water and combined waste water, treatment and recycling systems estimates that each person in the United States utilizes approximately 317 gallons of water per week.

Two of the largest uses of water in a household are toilet flushing and clothing washing. Each toilet flush utilizes between one and five gallons of water, and it is estimated that about 100 gallons of water are utilized each week per person just to flush toilets in the home. Each heavy load of laundry utilizes about 57 gallons of water, approximately 38 gallons of which is rinse water. Each person typically does about two to three heavy loads of laundry per week producing about 100 gallons of rinse water per week.

It is well known to recover grey water, which is used water recovered from sources such as sinks, dishwashers, clothes washers, bathtubs, showers, and even rain water run-off for recycling. However, known systems which recycle grey water suffer from several disadvantages. Grey water is generally heavily laden with contaminants such as hair, skin, food particles, soap, bacteria, and soil. Thus, known grey water recycling systems typically require extensive water treatment steps such as settling tanks, ozonators, and the like to eliminate the particulate matter and reduce the foul odors produced by the bacteria common in the grey water. Additionally, the quantity of grey water collected from a multitude of sources necessitates the use of complex piping systems attached to relatively large storage tanks and typically includes outdoor irrigation systems to make use of the large quantities of grey water which are collected.

A fact which appears to have gone unnoticed in the water recycling field is that rinse water from clothes washing machines is practically free from the contaminants typically found in grey water. Rinse water recovered from clothes washing machines usually has relatively low levels of soap, chlorine, and lint as contaminants. Thus, water recovered from the rinse cycle of clothes washing machines is more appropriately termed "cloudy" water to designate its relative lack of contaminants. Therefore, the terms "cloudy" water and "rinse" water used herein are synonymous terms for water recovered from the rinse cycle of a clothes washing machine.

Cloudy water is only lightly contaminated yet about 100 gallons per week of cloudy water is generated and disposed of by each person in an average dwelling. This is an extremely wasteful use of water. Therefore, a need exists for a water recovery and recycling apparatus which makes use of cloudy water, is simple and less expensive to install than grey water recovery systems and which makes use of the numerical relationship of the quantity of water needed to flush toilets each week and the amount of rinse water needed to wash clothing each week. A need also exists for a cloudy water recovery and recycling apparatus which eliminates the need for extensive water treatment.

SUMMARY OF THE INVENTION

Accordingly, it is an object of the present invention to provide a novel cloudy water recovery apparatus which recycles the recovered cloudy water by using the cloudy water to flush toilets.

Another object is to provide a kit attachable to a clothes washing machine to recover cloudy water and to recycle the cloudy water by using it to flush toilets.

Another object is to provide a clothes washing machine having an integral cloudy water recovery apparatus which allow the apparatus user to flush toilets with the recovered cloudy water.

Another object is to provide a method for recovering and recycling cloudy water in which the cloudy water is recycled by using the cloudy water to flush toilets.

Briefly, these and other objects and advantages of the invention are accomplished by a cloudy water conservation apparatus which is attachable to a clothes washing machine having a wash cycle producing wash water and a rinse cycle producing rinse water. The apparatus is comprised of a.) an electronic controller in fluid communication with said clothes washing machine for separating said rinse water from said wash water; b.) rinse water storage means in fluid communication with said electronic controller for collecting and storing said rinse water; c.) a trap having a lint screen, said trap attached to said rinse water storage means and said trap in fluid communication with said electronic controller; d.) a pumping means in fluid communication with said rinse water storage means; e.) a pressurized container in fluid communication with said pumping means for receiving rinse water pumped by said pumping means from said rinse water storage means; f.) supply means in fluid communication with said pressurized container for supplying said pressurized rinse water to at least one toilet flush tank where said rinse water is used to flush at least one toilet.

Other objects, features, and advantages of the invention will become more apparent from the following detailed description of the invention when considered with the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings.

DESCRIPTION OF THE PREFERRED EMBODIMENTS

Figure 1:
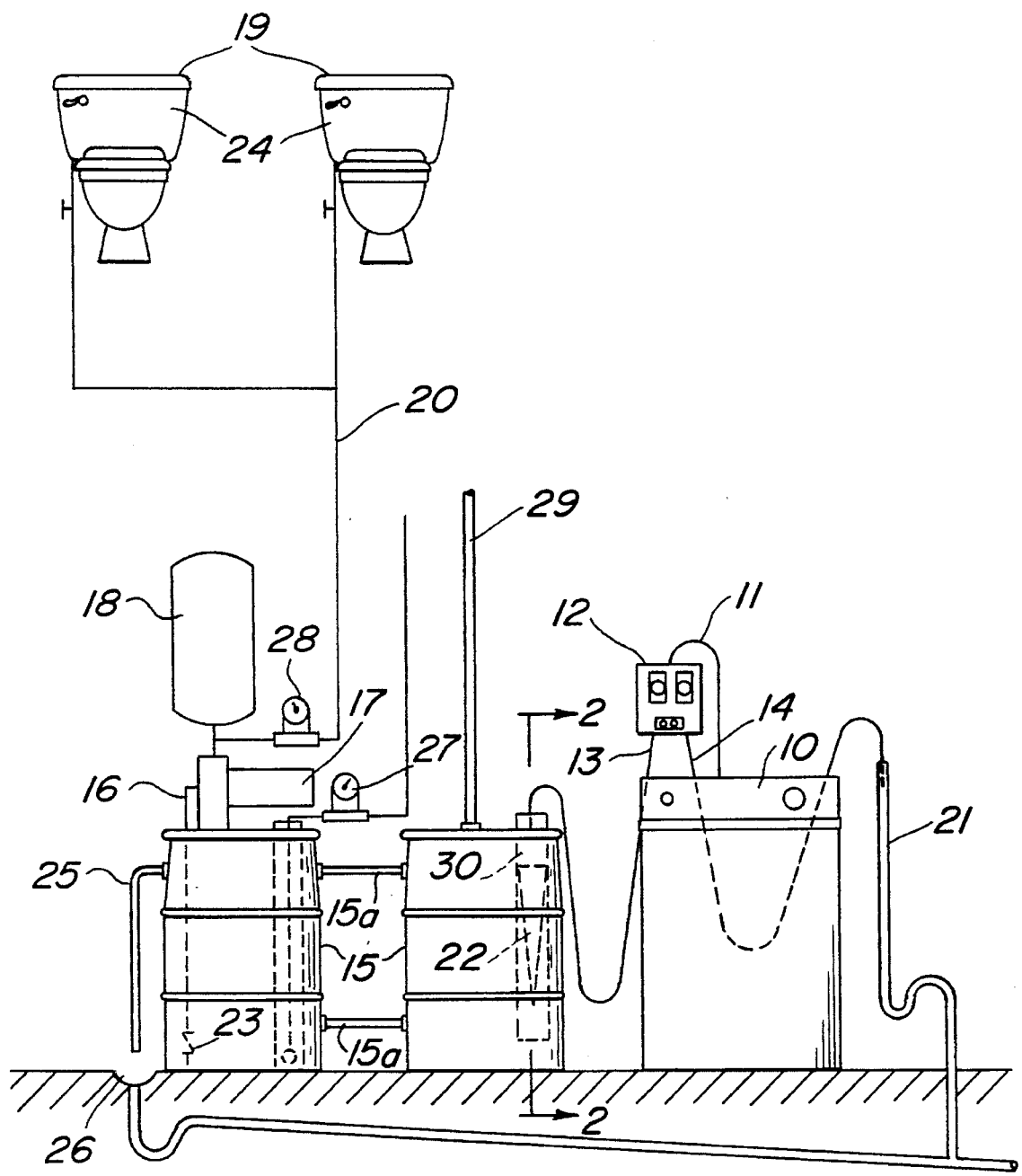
FIG. 1 is a perspective view of a cloudy water recovery and recycling apparatus according to the present invention.

Referring now to the drawings wherein like characters designate like or corresponding parts through the three figures, FIG. 1 shows a washing machine 10 having a water outlet 11 attached to and in fluid communication with an electronic controller 12. Electronic controller 12 has a timer mechanism (not shown), a valve means (not shown), a rinse water outlet 13, and a wash water outlet 14. Rinse water outlet 13 is attached to and in fluid communication with storage tank 15. A lint screen 22 is attached to a trap 30 which is attached to rinse water outlet 13 and to storage tank 15. Storage tank 15 has a vent 29 which vents tank 15 to the air outside of a dwelling. Storage tank 15 has a fresh water supply provided by piping 26 through meter 27, and an overflow pipe 25. Storage tank 15 is attached to and in fluid communication with suction line 16 which is attached to pump 17. Pump 17 is connected to pressurized container 18. Pressurized container 18 is attached to and in fluid communication with toilets 19 via toilet supply piping 20. Meter 28 is attached to toilet supply piping 20.

Figure 2:
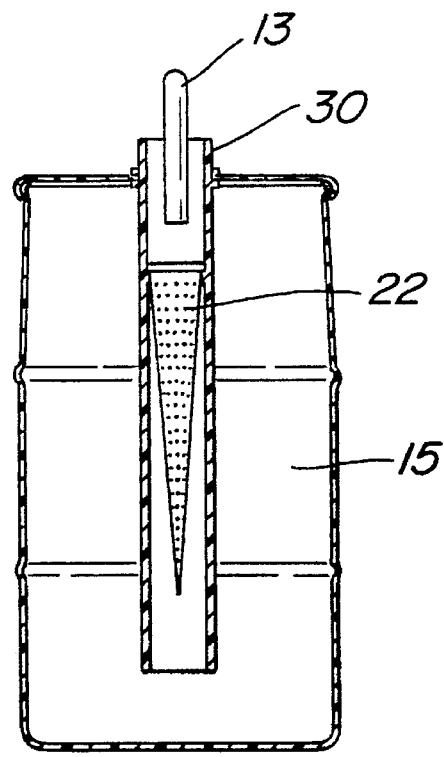
FIG. 2 is a sectional view of the apparatus taken along the line 2—2 of FIG. 1.
Figure 3:
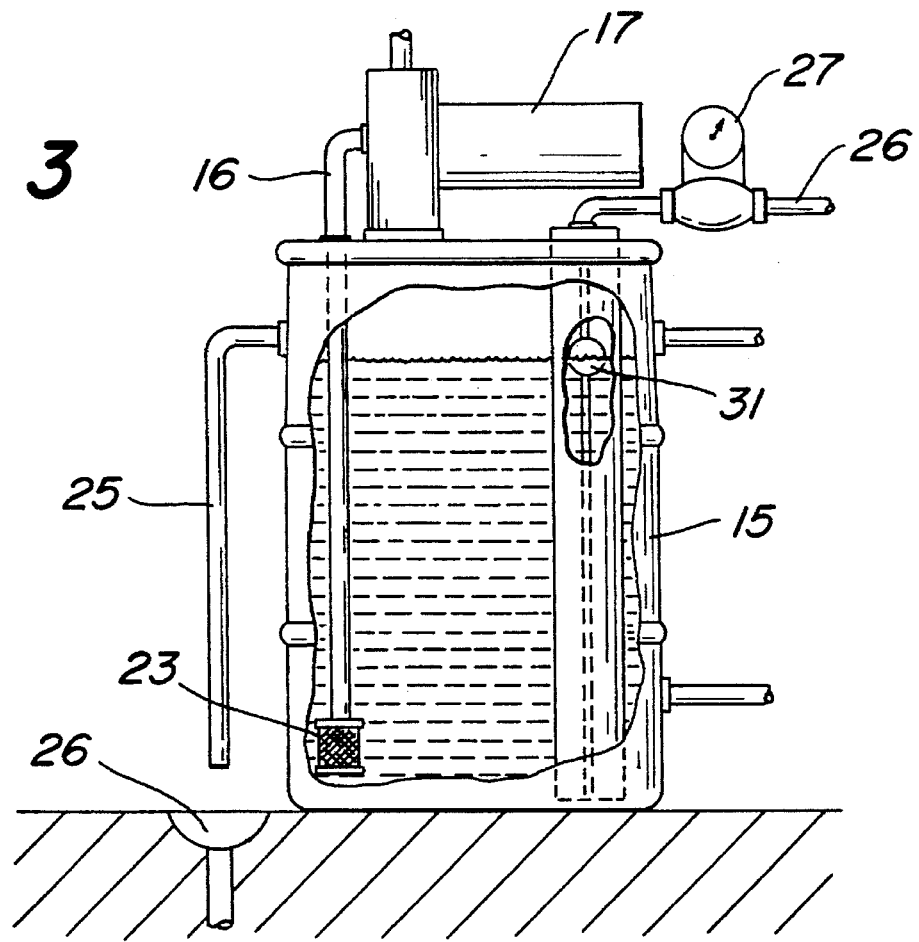
FIG. 3 is a partially cut-away perspective view of a portion of the apparatus of FIG. 1.

With reference to FIG. 1, the invention is utilized by setting the timer on electric controller 12 to correspond to the timing of the wash and rinse cycles of washing machine 10. Washing machine 10 is then started and, as washing machine 10 completes the wash cycle, it flushes wash water through water outlet 11 and into controller 12. The timer in controller 12 then adjusts the valve means to divert the wash water into sewer drain 21 via wash water outlet 14. Following the rinse cycle, washing machine 10 flushes rinse water through water outlet 11 into controller 12 where the timer in controller 12 adjusts the valve means to divert the rinse water through the rinse water outlet 13, into trap 30 containing lint screen 22 and into storage tank 15. Lint screen 22 shown in FIG. 2 filters particulates from the rinse water as it passes from rinse water outlet 13 into storage tank 15. The preferred amount of rinse water to be recovered for flushing is from about 75 gallons to 150 gallons of rinse water per week per person. The most preferred amount is from about 90 gallons to 135 gallons of rinse water per week per person. Storage tank 15 is shown in FIG. 1 as being composed of two drums connected by piping 15a. However, the size and configuration of the tank are a matter of design choice for the user and will depend on the quantity of rinse water the user desires to collect and the number of people in the dwelling where the invention is utilized. As shown in FIG. 3, tank 15 is attached to suction line 16 which has at it's terminal end a valve such as a foot valve 23 located near the bottom of tank 15. Suction line 16 provides a vacuum by pump 17 which pumps water from tank 15 to pressurized container 18 as shown in FIG. 1. Pressurized container 18 stores water for filling toilet flush tanks 24. When a toilet 19 is flushed, a float valve in toilet tank 24, well known to those skilled in the art, opens in response to the drop in water level in tank 24 thereby creating a demand for water. Water is then supplied to the flush tank 24 via toilet supply line 20 from pressurized container 18. A sensor in tank 18 then activates pump 17 and refills tank 18 from storage tank 15. Storage tank 15 is shown in FIGS. 1 and 3 as having an overflow pipe 25 which drains to a sewer via floor drain 26. Overflow pipe 25 prevents overfilling of tank 15 in the event that more rinse water from the clothes washing machine is supplied to tank 15 then tank 15 has the volumetric capacity to hold. However, if the invention is installed in a dwelling which does not have a convenient floor drain leading to a sewer, the apparatus can, in lieu of pipe 25, have an electronic float connected to the controller which indicates when tank 15 is near full capacity. The full capacity signal by the float causes controller 12 to direct all rinse water through wash water outlet 14 and into sewer drain 21. As a fail-safe measure, if power is disrupted or there is a mechanical failure in controller 12, the default position of the valve means in controller 12 is to direct both wash and rinse water into sewer drain 21. In the event that the amount of rinse water stored in tank 15 is insufficient to fill pressurized container 18 and thereby flush the toilets 19, tank 15 also has a make-up water supply of fresh water from fresh water line 26 as shown in FIGS. 1 and 3. Line 26 is connected to a float valve 31 shown in FIG. 3 which supplies fresh water to tank 15 when the amount of recovered rinse water drops below a preset level. A back flow prevention device or a water gap can also be installed between line 26 and tank 15 to prevent back flow contamination of line 26. Meter 27 on line 26 monitors the amount of fresh water utilized to fill tank 15, and meter 28 on supply pipe 20 monitors the amount of water utilized to flush toilets 19. Tank 15 stores only cloudy water which is relatively free of contaminants and, thus, does not require extensive water treatment. However, since the cloudy water is not potable, water recycling standards require that cloudy water be dyed to indicate that it is not potable. The most convenient way to dye cloudy water within the apparatus is to drop toilet disinfection cakes containing colored dyes into tank 15 through trap 30. Disinfection cakes effectively dye the cloudy water to conform to recycling standards, and the cakes also kill any bacteria within tank 15, thereby, eliminating any offensive odors which may develop within the trap or within tank 15. To further reduce the possibility of odors, tank 15 is vented to the dwelling exterior by air vent 29.

In another embodiment of this invention, the water conservation apparatus is put into kit form for installation in a dwelling by a plumber. The kit is comprised of an electric controller, a rinse water hose, a wash water hose, a storage tank, a trap having a lint screen, a vent, an overflow drain pipe or an electronic float, a foot valve, a pump, a pressurized container, a toilet water supply meter, a make-up water supply valve, a make-up water meter, and associated piping. The plumber can purchase the kit and attach the kit components to a customer's washing machine, electrical outlets, toilets, drains, and fresh water supply as described herein with reference to FIGS. 1–3 to recover and recycle cloudy water by using the cloudy water to flush toilets.

In another embodiment of this invention, the water conservation apparatus is comprised of a washing machine having a controller, a rinse water hose, a wash water hose, a storage tank, a trap having a lint screen, a vent, an overflow drain pipe or electronic float, a foot valve, a pump, a pressurized container, a toilet water supply meter, a make-up water supply valve, a make-up water meter, as an integral unit. The integral unit, when attached to associated piping and electrical outlets, provides a clothes washing machine which has the capability of recycling washing machine rinse water to flush toilets.

The process by which water is recycled by this invention comprises the following steps:

a.) separating water produced by a clothes washing machine into wash water and rinse water, b.) disposing of said wash water of step a.), c.) collecting said rinse water of step a.), d.) straining said rinse water of step c.) to remove particulates, e.) treating said rinse water of step d.) with dye and bactericide, f.) pressurizing said rinse water of step e.) by pumping said rinse water to a pressurized storage container, g.) conveying said rinse water from said pressurized storage tank to a toilet flush water storage tank, and h.) recycling said rinse water of step g.) by flushing a toilet attached to said toilet flush water storage tank.

Thus, the apparatus and the method of using the apparatus as described herein provides an efficient, relatively inexpensive means for recycling rinse water collected from clothes washing machines by using the rinse water to flush toilets.

The apparatus utilizes clothes washing machine rinse water or cloudy water, which is low in bacteria and soil particulates, thus eliminating the need for elaborate grey water treatment. The apparatus also makes use of a quantified water volume use relationship between rinse water from clothes washing machines and the amount of water needed to flush toilets to thereby eliminate the need for irrigation systems associated with grey water collection systems.

The invention is particularly well suited for dwellings such as homes and apartment buildings and can be adapted for use practically anyplace where both washing machines and toilets are utilized.

The following non-limitative Examples illustrate the practical usage of the invention described herein:

Example I

| Apparatus A Number of Dwelling Occupants: Weeks 1–24:3    Weeks 24–72:4 | |
| --- | --- |
| Weeks after Installation | Cumulative Gallons of water Recycled |
| 1 | 900 |
| 4 | 1,400 |
| 8 | 4,325 |
| 13 | 5,720 |
| 18 | 6,960 |
| 24 | 8,810 |
| 62 | 20,460 |
| 72 | 23,810 |

Average amount water recycled between Weeks 1–24:122 gallons per week per person Example II

| Apparatus B Number of Dwelling Occupants: 4 | |
| --- | --- |
| Weeks after Installation | Gallons of water Recycled |
| 1 | 400 |
| 2 | 802 |
| 3 | 1,172 |
| 4 | 1,610 |
| 6 | 2,000 |
| 8 | 2,760 |
| 10 | 3,350 |
| 18 | 6,490 |
| 30 | 10,755 |
| 51 | 20,240 |
| 56 | 22,440 |
| 63 | 23,800 |

Average amount of water recycled: 94 gallons per week per person

Example III

| Apparatus C Number of Dwelling Occupants: 2 | |
| --- | --- |
| Weeks after Installation | Gallons of water Recycled |
| 1 | 180 |
| 2 | 530 |
| 3 | 740 |
| 5 | 1,095 |
| 11 | 2,010 |
| 45 | 9,584 |
| 47 | 9,944 |
| 54 | 10,304 |
| 62 | 12,720 |

-continued

| Apparatus C Number of Dwelling Occupants: 2 | |
| --- | --- |
| Weeks after Installation | Gallons of water Recycled |

Average amount of water recycled: 103 gallons per week per person

It will be understood, of course, that changes in the details and arrangement of steps and parts which have been described and illustrated herein in order to explain the nature of the invention, may be made by those skilled in the art without departing from the principles and scope of the invention as expressed in the appended claims.

I claim:

1. A cloudy water conservation apparatus attachable to a clothes washing machine having a water outlet, a wash cycle producing wash water and a rinse cycle producing rinse water comprising:

a.) electronic controller means in fluid communication with the outlet of said washing machine for separating said rinse water from said wash water with said wash water being directed down a drain;

b.) rinse water storage means in fluid communication with said controller for collecting and storing said rinse water which was directed to said storage means by said controller;

c.) a trap having a lint screen, said trap attached to said rinse water storage means and said trap in fluid communication with said controller;

d.) a pumping means in fluid communication with said rinse water storage means;

e.) a pressurized container in fluid communication with said pumping means for receiving rinse water pumped by said pumping means from said rinse water storage means; and f.) supply means in fluid communication with said pressurized container for supplying said pressurized rinse water to at least one toilet flush tank where said rinse water is used to flush at least one toilet.

2. The apparatus of claim 1 wherein said controller has a timer mechanism, a valve means, a rinse water outlet, and a wash water outlet.

3. The apparatus of claim 2 wherein said rinse water storage means is a tank having a vent to the exterior of a dwelling.

4. The apparatus of claim 3 wherein said pumping means is a jet pump attached to a foot valve, said foot valve positioned within said rinse water storage means.

5. The apparatus of claim 4 wherein said rinse water storage means is attached to a make-up water supply line of fresh water.

6. The apparatus of claim 5 wherein said rinse water storage means is accessible for treating said rinse water with dye and bactericide.

7. The apparatus of claim 6 wherein said supply means includes a water flow meter for monitoring the quantity of water supplied to said toilet flush tank.

8. The apparatus of claim 7 wherein said make-up water supply line includes a water flow meter for monitoring the quantity of fresh water supplied to said rinse water storage means by said make-up water supply line.

9. The apparatus of claim 8 wherein said rinse water storage means stores from about 75 to about 150 gallons of rinse water per week per person utilizing said apparatus.

10. The apparatus of claim 9 wherein said rinse water storage means has an overflow pipe which drains to a sewer.

11. The apparatus of claim 9 wherein said rinse water storage means has an electronic float electrically connected to said controller, said electric float preventing overfilling of said rinse water storage means by signaling said controller that said rinse water storage means is near full, thereby, causing said controller to divert rinse water from a clothes washing machine rinse cycle into a sewer.

12. A water conservation process comprising:
   a.) separating water produced by a clothes washing machine into wash water and rinse water;
   b.) disposing of said wash water;
   c.) collecting said rinse water;
   d.) straining said rinse water of step c) to remove lint;
   e.) treating said rinse water of step d) with dye and bactericide;
   f.) pressurizing said rinse water of step e) by pumping said rinse water to a pressurized storage tank;
   g.) conveying said rinse water of step f.) from said pressurized storage tank to an toilet flush water storage tank; and
   h.) recycling said rinse water of step g) by flushing a toilet attached to said toilet flush water storage tank.

* * * * *